US011899391B2

(12) United States Patent
Kume

(10) Patent No.: US 11,899,391 B2
(45) Date of Patent: Feb. 13, 2024

(54) IMAGE FORMING APPARATUS

(71) Applicant: CANON KABUSHIKI KAISHA, Tokyo (JP)

(72) Inventor: Takao Kume, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/192,824

(22) Filed: Mar. 30, 2023

(65) Prior Publication Data

US 2023/0350334 A1 Nov. 2, 2023

(30) Foreign Application Priority Data

Apr. 1, 2022 (JP) ................................ 2022-061733

(51) Int. Cl.
*G03G 21/00* (2006.01)
*G03G 15/00* (2006.01)
*G03G 15/08* (2006.01)
*G03G 15/095* (2006.01)

(52) U.S. Cl.
CPC ..... *G03G 21/0064* (2013.01); *G03G 15/0813* (2013.01); *G03G 15/095* (2013.01); *G03G 15/5004* (2013.01); *G03G 2215/00025* (2013.01); *G03G 2221/0005* (2013.01)

(58) Field of Classification Search
CPC ............ G03G 15/0813; G03G 15/095; G03G 15/5004; G03G 21/0064; G03G 2215/00025; G03G 2221/0005
See application file for complete search history.

(56) References Cited

U.S. PATENT DOCUMENTS

| | | | | |
|---|---|---|---|---|
| 8,452,200 | B2 | 5/2013 | Ogiso et al. | |
| 10,712,698 | B2 | 7/2020 | Mukai et al. | |
| 2004/0018028 | A1* | 1/2004 | Chiba ................ | G03G 21/0064 399/149 |
| 2010/0316400 | A1* | 12/2010 | Murasaki ........... | G03G 15/0131 399/53 |
| 2016/0291523 | A1* | 10/2016 | Noguchi .............. | G03G 15/161 |

FOREIGN PATENT DOCUMENTS

| | | | |
|---|---|---|---|
| JP | 2003-345101 | A | 12/2003 |
| JP | 2008-026521 | A | 2/2008 |
| JP | 2011-227241 | A | 11/2011 |
| JP | 2019-164229 | A | 9/2019 |
| JP | 2021-124604 | A | 8/2021 |

* cited by examiner

*Primary Examiner* — Joseph S Wong
(74) *Attorney, Agent, or Firm* — Venable LLP

(57) ABSTRACT

An image forming apparatus capable of forming images in mono-color and a plurality of colors includes first and second image forming units and a control unit. The image forming unit includes a rotatable image bearing member, a rotatable developing member that contacts the image bearing member to supply a developer to the surface thereof, and a developer supply member that supplies the developer to the developing member. The control unit switches between an image forming operation of forming an image on the image bearing member surface and a cleaning operation of removing an attached matter on the image bearing member surface with the developing member by controlling a voltage applied to the developing member and a voltage applied to the developer supply member.

9 Claims, 14 Drawing Sheets

IMAGE FORMING APPARATUS

BACKGROUND OF THE INVENTION

Field of the Invention

The present invention relates to an image forming apparatus.

Description of the Related Art

An electrophotographic image forming apparatus forms an image by developing an electrostatic latent image formed on the surface of a photosensitive drum as an image bearing member with a developer located on a developer carrying member. A configuration of a contact development system is known in which development at the time of image formation is performed while the developer carrying member is in contact with the image bearing member. A developing roller having an elastic layer on the outer peripheral surface of a rotationally driven shaft member is generally used as the developer carrying member in such a contact developing system configuration.

Further, an image forming apparatus of a so-called image bearing member cleanerless system (hereinafter can be also simply referred to as "cleanerless system") is known in which no cleaning means is provided to remove and collect toner remaining on the image bearing member in order to reduce the size of the image forming apparatus and to reduce the cost by decreasing the number of components.

In a cleanerless image forming apparatus, untransferred toner and fogging toner enter between a photosensitive drum and a charging roller, so the toner under stress between the photosensitive drum and the charging roller may fuse to the photosensitive drum. Since the photosensitive drum to which the toner is fused interferes with exposure, blank dots may appear in the image. Furthermore, where the fused portion continues in the circumferential direction of the photosensitive drum, an image defect such as a white streak occurs.

In the cleanerless system, it is necessary to collect the toner that has not been used for image formation, such as untransferred toner and fogging toner, in a developing unit. However, the toner fused onto the photosensitive drum cannot be removed and recovered unless a strong force is applied in the developing unit. Normally, a developing roller is covered with a toner layer, but by exposing the surface layer of the developing roller from the toner layer, it is possible to rub the photosensitive drum more strongly and remove the toner present on the photosensitive drum.

Furthermore, a product using an intermediate transfer belt as an intermediate transfer body has been put to practical use as an image forming apparatus. In an image forming apparatus using such an intermediate transfer belt, a toner image formed on a photosensitive drum is first primarily transferred to the intermediate transfer belt by a primary transfer means. Next, a secondary transfer means secondarily transfers the toner image on the intermediate transfer belt onto a transfer material. Then, the toner image on the transfer material is fixed with a fixing device.

In the case of a color image forming apparatus, process cartridges are arranged outside the intermediate transfer belt, for example, in the order of yellow, magenta, cyan, and black from the upstream side along the rotational movement direction of the intermediate transfer belt. The process cartridge has a photosensitive drum, a charging means around the photosensitive drum, an exposure means, and a developing means. A primary transfer means that performs primary transfer is arranged at a position facing each photosensitive drum of each process cartridge with an intermediate transfer belt interposed therebetween.

Furthermore, in order to improve durability in image forming apparatuses, a method is used by which the photosensitive drum and the developing roller are brought into contact with each other only when necessary and separated when not necessary. With this method, in a single-color image forming mode for forming a single-color image (mono-color printing), only a black developing roller is in contact with the photosensitive drum, and the developing rollers other than black are separated from the photosensitive drums. The state of the developing rollers at this time is called mono-contact. Meanwhile, a state in which all developing rollers are in contact with the photosensitive drums during full-color printing is called full contact. Further, a state in which all the developing rollers are separated from the photosensitive drum at times other than the printing operation is referred to as full separation. Such an image forming apparatus of the development-separation type may undergo a state transition in a cycle of full separation, full contact, mono-contact, and full separation, according to the printing state.

In the image forming operation, development contact is performed in accordance with the start of image formation and development separation is performed after the image formation is completed through a preprocessing operation (hereinafter referred to as a pre-rotation sequence) for starting the driving of the drive source and the supply of high voltage. After that, a post-processing operation (hereinafter referred to as a post-rotation sequence) for stopping the supply of high voltage and stopping the drive source is performed, and a series of image forming operations is completed.

When such an image forming apparatus executes a print job in which full-color printing and mono-color printing are mixed, the post-rotation sequence and the pre-rotation sequence need to be performed each time a transition is made from full-color printing to mono-color printing or from mono-color printing to full-color printing, thereby prolonging the time to complete the print job.

Regarding the problem of fusion on the photosensitive drum, Japanese Patent Application Publication No. 2021-124604 describes scraping and removing an attached matter on the surface of the photosensitive drum with a developing roller.

Further, regarding the problem that the completion time of a print job in which full-color printing and mono-color printing are mixed is prolonged, Japanese Patent Application Publication No. 2003-345101 discloses switching between development and separation operations without stopping the printing operation, thereby shortening the image forming time and suppressing the unnecessary use of process cartridges so that performance deterioration is reduced.

SUMMARY OF THE INVENTION

However, in the configurations described in the above documents, for example, when a transition is made from full-color printing to mono-color printing, since image forming operation is completed in mono-color printing after the developing roller made a transition from a full-contact state to a mono-contact state, the scraping operation is executed only for black.

The present invention has been made in view of the above problems, and an object of the present invention is to efficiently clean toner on a photosensitive drum with a developing roller in an image forming apparatus of a cleanerless system that is capable of executing full-color printing and mono-color printing.

The present invention provides an image forming apparatus comprising a first image forming unit corresponding to a first color and a second image forming unit corresponding to a second color other than the first color, wherein the first image forming unit includes: a rotatable first image bearing member, a surface of which is exposed to light to form an electrostatic latent image on the surface of the first image bearing member; a rotatable first developing member that contacts the first image bearing member to supply a developer to the surface of the first image bearing member and that rotates at a rotational speed different from a rotational speed of the first image bearing member; and a first developer supply member that supplies the developer to the surface of the first developing member, and wherein the second image forming unit includes: a rotatable second image bearing member, a surface of which is exposed to light to form an electrostatic latent image on the surface of the second image bearing member; a rotatable second developing member that contacts the second image bearing member to supply a developer to the surface of the second image bearing member and that rotates at a rotational speed different from a rotational speed of the second image bearing member; and a second developer supply member that supplies the developer to the surface of the second developing member, the image forming apparatus further comprising:

a control unit configured to control a development voltage applied to the first developing member and the second developing member and a supply voltage applied to the first developer supply member and the second developer supply member, the control unit being capable of executing an image forming operation of forming a developer image on the surface of the first image bearing member by supplying the developer to the latent electrostatic image formed on the surface of the first image bearing member from the first developing member and of forming a developer image on the surface of the second image bearing member by supplying the developer to the latent electrostatic image formed on the surface of the second image bearing member from the second developing member, and a cleaning operation which is other than the image forming operation and by which an attached matter that has attached to the surface of the image bearing member is removed by the developing member, wherein the image forming operation includes a first image forming operation of forming an image by using only the first image forming unit, and a second image forming operation of forming an image by using the first image forming unit and the second image forming unit;

the first image forming unit can move the first developing member between a contact state in which the first developing member and the first image bearing member are in contact with each other and a separation state in which the first developing member and the first image bearing member are separated from each other, the second image forming unit can move the second developing member between a contact state in which the second developing member and the second image bearing member are in contact with each other and a separation state in which the second developing member and the second image bearing member are separated from each other, and, the image forming operation and the cleaning operation are performed in the contact state; and the control unit is configured to perform control to execute the cleaning operation after the second image forming operation in a case of switching from the second image forming operation to the first image forming operation;

to perform control to execute the cleaning operation in the first image forming unit and the second image forming unit without causing the second developing member that is in the contact state with the second image bearing member to make a transition to the separation state in the second image forming unit; and to perform control to cause the second developing member to make a transition to the separation state in the second image forming unit after the cleaning operation, and to execute the first image forming operation in the first image forming unit.

According to the present invention, in an image forming apparatus of a cleanerless system that is capable of performing full-color printing and mono-color printing, toner on a photosensitive drum can be efficiently cleaned with a developing roller.

Further features of the present invention will become apparent from the following description of exemplary embodiments with reference to the attached drawings.

DESCRIPTION OF THE EMBODIMENTS

Preferred embodiments of the present invention will be exemplarily described in detail below with reference to the drawings. However, the dimensions, materials, shapes, and relative positions of components described in the following embodiments should be changed, as appropriate, according to the configuration of the apparatus to which the present invention is applied and various conditions. Therefore, it is not intended to limit the scope of the invention unless specifically stated otherwise.

Embodiment 1

Figure 1:
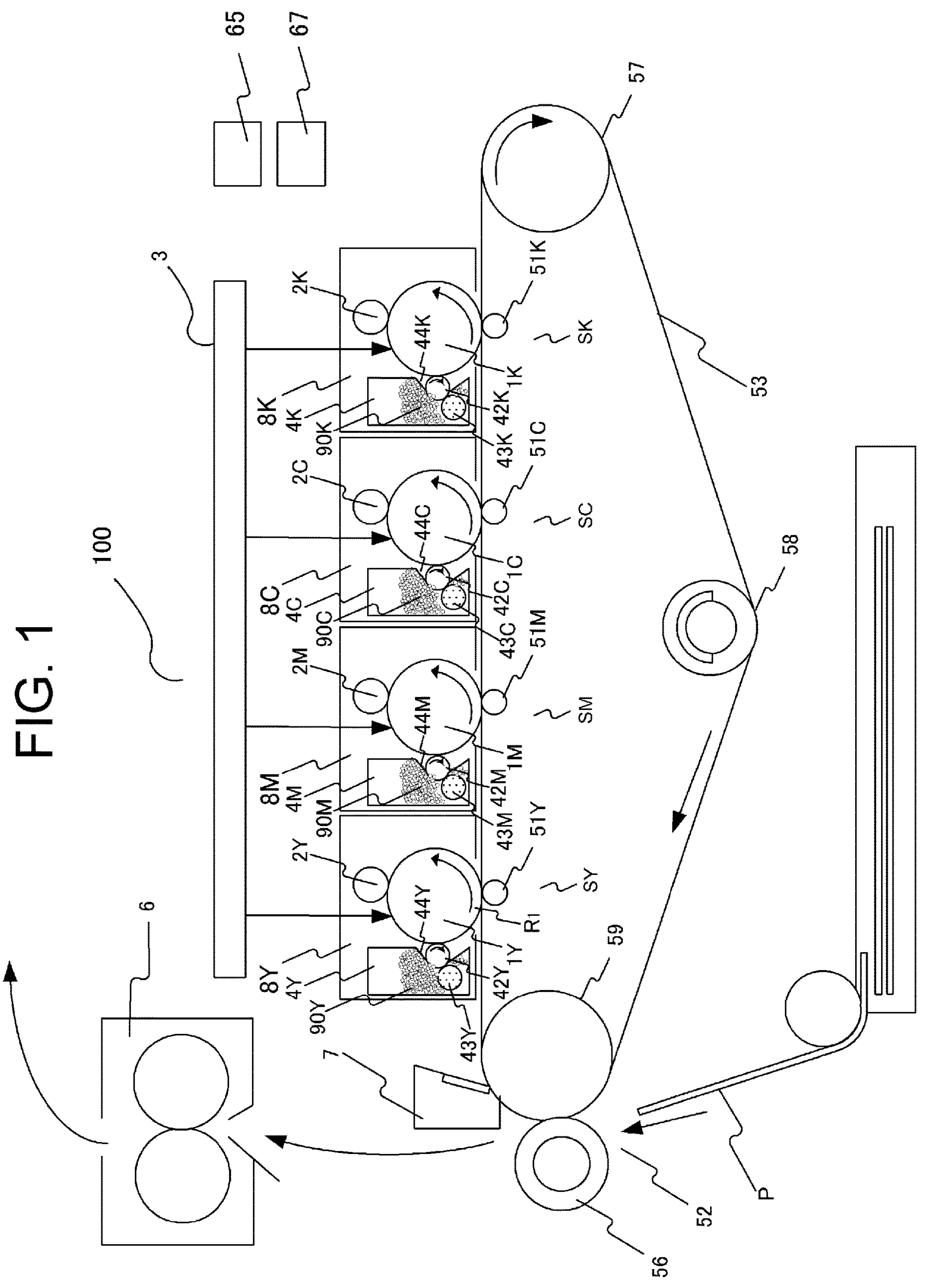
FIG. 1 is a block diagram of a color image forming apparatus used for explaining Embodiment 1.

The overall configuration and image forming operation of an electrophotographic image forming apparatus (hereinafter referred to as image forming apparatus) according to Embodiment 1 of the present invention will be described with reference to FIG. 1. FIG. 1 is a schematic cross-sectional view showing a schematic configuration of an image forming apparatus 100 according to an embodiment of the invention.

In the present embodiment, four color image forming stations S (SY, SM, SC, and SK) of yellow, magenta, cyan, and black are provided in combination as image forming units in order from left to right in the drawing. Each image forming station is an electrophotographic image forming mechanism having the same configuration, except that the color of a developer (hereinafter referred to as toner) 90 contained in each developing apparatus is different. In the following description, any one of symbols Y (yellow), M (magenta), C (cyan), and K (black) is attached to the reference numerals when it is necessary to distinguish colors. Meanwhile, if there is no need to distinguish between colors, these symbols are omitted. The plurality of image forming stations S correspond to an image forming station SK (first image forming unit) corresponding to black as the first color, and stations corresponding to colors (yellow, magenta, and cyan) other than the first color. Mono-color printing in which an image is formed only with the first color, is the first image forming operation. Full-color printing in which an image is formed with all of a plurality of colors including the first color is a second image forming operation.

Each image forming station has a photosensitive drum 1 as an image bearing member, a charging roller 2 as a charging means, a developing apparatus 4, a primary transfer device 51, and the like as main components. The primary transfer device 51 faces the photosensitive drum 1 with an intermediate transfer belt 53 interposed therebetween as an intermediate transfer member. An exposure device 3 may be common to all image forming stations, or may be provided for each image forming station.

In the present embodiment, the photosensitive drum 1, the charging roller 2, and the developing apparatus 4 are integrated as a process cartridge 8 and configured to be detachably attachable to an image forming apparatus main body (the portion of the image forming apparatus 100 excluding the process cartridge 8). However, the process cartridge in the present invention may include at least the photosensitive drum 1 and the developing apparatus 4 and may be configured to be detachably attachable to the apparatus main body as a whole. Also, the developing apparatus 4 alone may be configured to be independently detachably attachable to the apparatus main body or the process cartridge 8. Further, the photosensitive drum 1 and the developing apparatus 4 may be fastened to the main body of the image forming apparatus to eliminate the need for replacement by the user.

The photosensitive drum 1 is a rotatable cylindrical photosensitive member and rotates in the direction of arrow (counterclockwise direction in the figure) about the axis of the cylinder. The peripheral surface of the photosensitive drum 1 of the present embodiment is rotationally driven at a rotational speed of 180 mm/sec.

The surface of the photosensitive drum 1 is uniformly charged by the charging roller 2. In the present embodiment, the charging roller 2 is a conductive roller in which a conductive rubber layer is provided on a metal core and which is installed by bringing into contact with the photosensitive drum 1 in parallel therewith by a predetermined pressure to rotate with the rotation of the photosensitive drum 1. A charging voltage can be applied to the charging roller 2 from a power supply device 67 (power supply means). In the present embodiment, the photosensitive drum 1 is charged by applying a DC voltage of −1150 V to the charging roller 2. The surface potential of the photosensitive drum 1 at that time is about −500 V.

The exposure device 3 as an exposure unit acquires an image signal from a control unit 65 and scans the surface of the photosensitive drum 1 with a laser beam corresponding to the image signal. As a result, an electrostatic latent image corresponding to the image signal is formed on the charged photosensitive drum 1. The image signal may be acquired from an external information processing device 900. As the control unit 65, for example, an information processing device such as a control circuit having computing resources such as a processor and a memory can be used.

Figure 2:
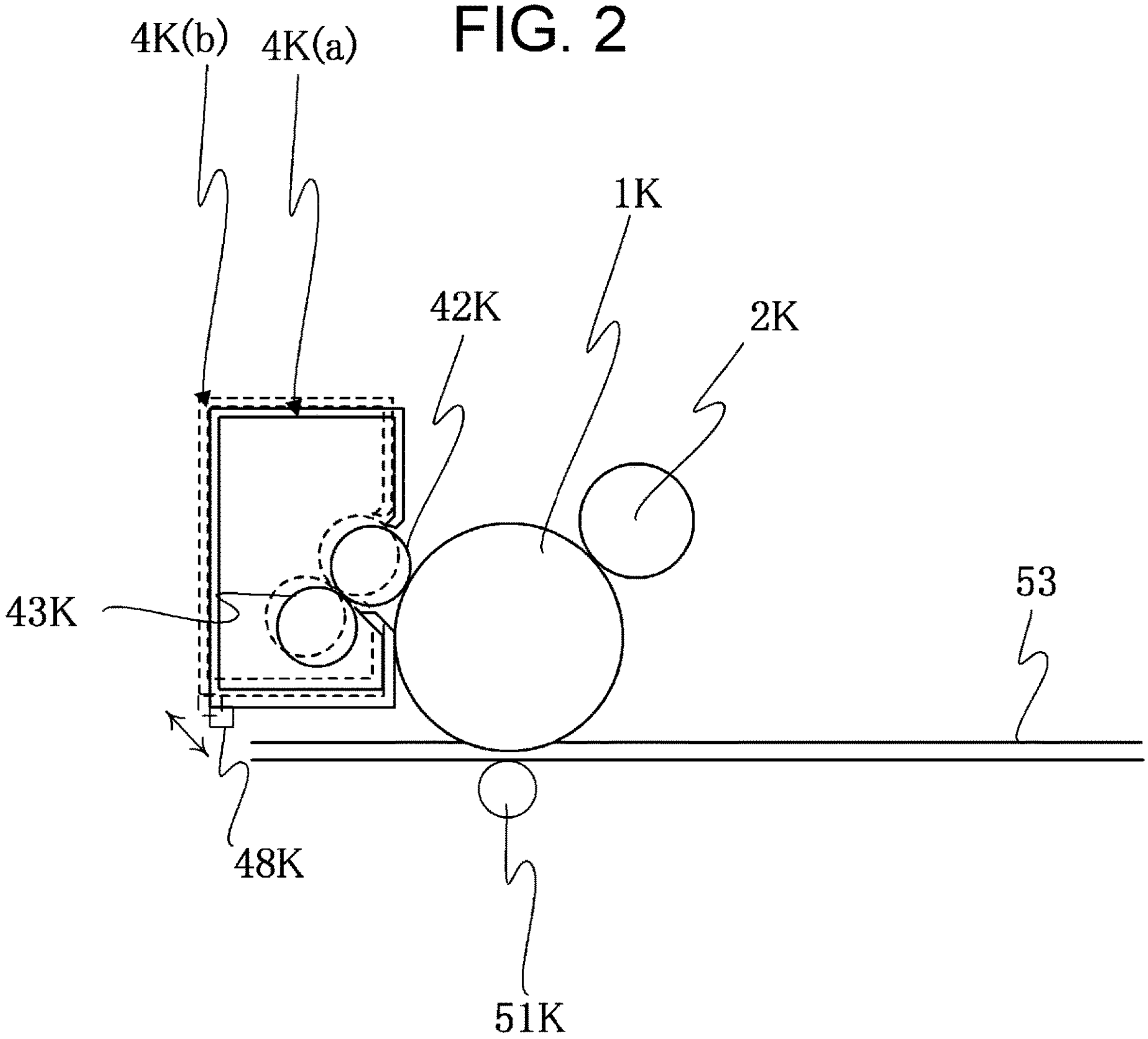
FIG. 2 explains the development separation in Embodiment 1.

The developing apparatus 4 supplies the toner 90 to the electrostatic latent image on the photosensitive drum 1 to visualize the latent image as a toner image (developer image). The developing apparatus 4 is provided so as to enable contact with and separation from the photosensitive drum 1 by a contact/separation mechanism 48. FIG. 2 shows an example of a black image forming station. A developing apparatus 4K can be in a contact state (indicated by solid line 4K(a)) and a separation state (indicated by dashed line 4K(b)). The developing apparatus 4 contacts (development contact) the photosensitive drum 1 only during image formation. As the contact/separation mechanism 48, for example, a mechanism can be used such that changes the positional relationship of the developing apparatus 4 with respect to the photosensitive drum 1 by pushing a receiving portion provided at the developing apparatus 4 by a moving member that is driven by the drive source to move in parallel or rotate, and that changes the positional relationship of the photosensitive drum 1 and the developing roller 42 from the contact state to the separation state or from the separation state to the contact state. However, the structure of the contact/separation mechanism 48 is not limited to this.

The developing apparatus 4 is equipped with the rotatable developing roller 42 as a developing member, a toner supply roller 43 as a developer supply member, and a regulating blade 44 as a developer regulating member. The toner supply roller 43 is an elastic sponge roller in which foam is formed on the outer periphery of a conductive core. The toner supply roller 43 is installed so as to come into contact with the developing roller 42 with a predetermined penetration amount. The toner 90 supplied by the toner supply roller 43 and held by the developing roller 42 is regulated in thickness by the regulating blade 44 to form a thin layer that is used for development. Here, the regulating blade 44 has the function of regulating the layer thickness of the toner 90 on the developing roller 42, and at the same time has the function of developer charging means for imparting a predetermined charge to the toner 90 on the developing roller 42.

The power supply device 67 is configured to be capable of functioning as a development voltage application unit 671 that applies a development voltage to the developing roller

Figure 14:
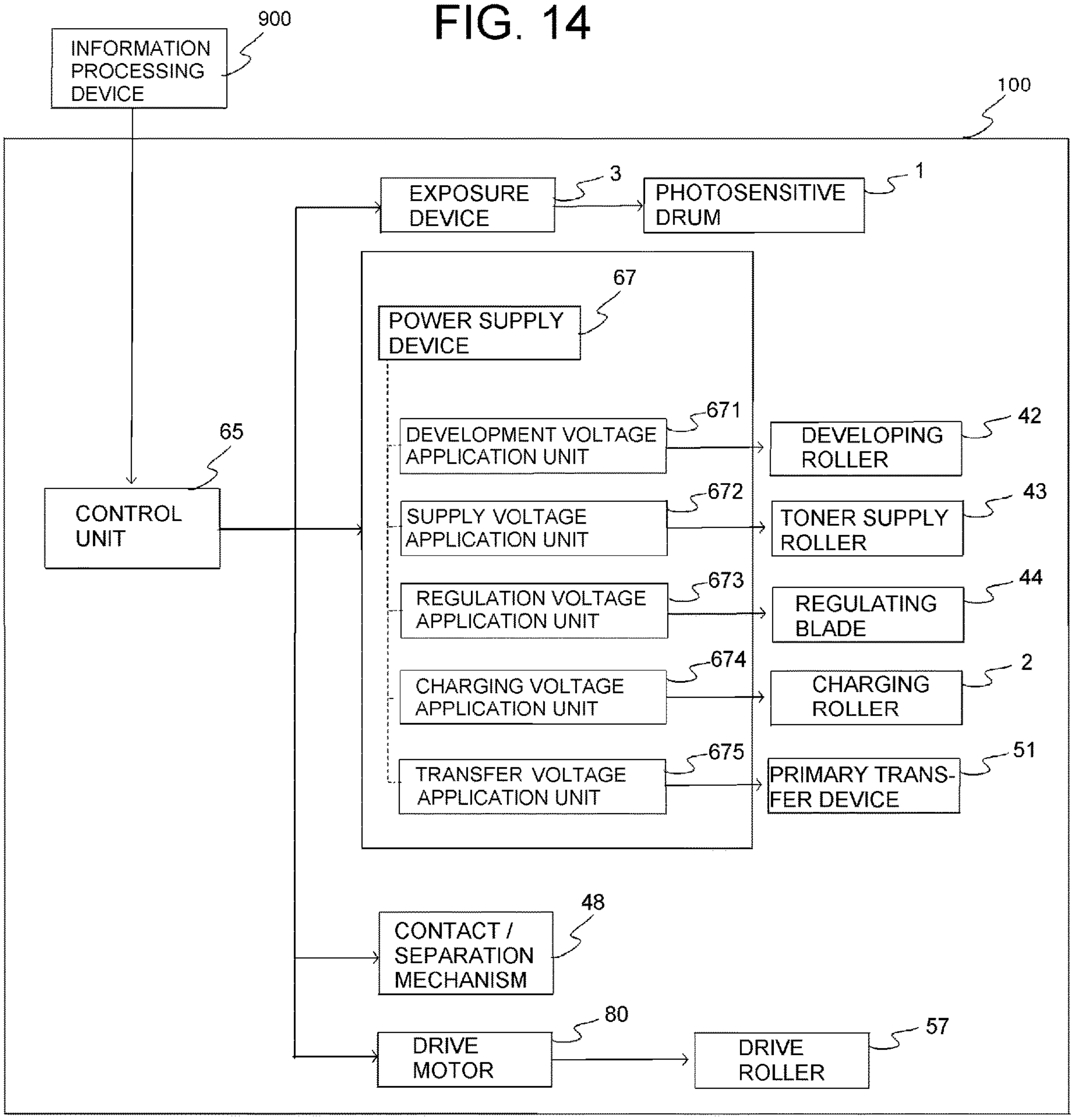
FIG. 14 is a block diagram showing an example of a control system of the image forming apparatus.

42 included in the developing apparatus 4, a supply voltage application unit 672 that applies a supply voltage to the toner supply roller 43, and a regulation voltage application unit 673 that applies a regulation voltage to the regulating blade 44. The power supply device 67 may be provided separately as the charging power supply for the charging roller and the development power supply for the developing apparatus. In that case, the charging power supply and the development power supply may be considered together as power supply means. Furthermore, the development power supply for the developing roller and the power supply for the toner supply roller may be separate. In that case, the charging power supply, the development power supply, and the supply power supply may be considered together as power supply means. Further, the power supply device 67 may be used for voltage application during image transfer, or a separate transfer power supply may be provided. The power supply device 67 of the present embodiment changes the voltage applied to each component under the control by the control unit 65. FIG. 14 is a block diagram showing an example of a control system based on the control unit 65. This figure shows an example in which the power supply device 67 functions as a charging voltage application unit 674 and a transfer voltage application unit 675 in addition to the development voltage application unit 671, the supply voltage application unit 672 and the regulation voltage application unit 673.

The developing roller 42 is rotationally driven in the direction of the arrow in the figure (clockwise direction in the figure) so that the direction of movement of the surface thereof is the same as that of the photosensitive drum 1. The developing roller 42 can rotate at a rotational speed different from that of the photosensitive drum 1. In the present embodiment, the developing roller 42 is rotationally driven so that the moving speed of the surface of the developing roller 42 is higher than the moving speed of the surface of the photosensitive drum 1 in order to obtain an appropriate image density. Further, the developing apparatus 4 is pressed toward the photosensitive drum 1 side by an urging means (not shown), and as a result, the developing roller 42 is pressed against the photosensitive drum 1. The surface of the developing roller 42 is thereby deformed to form a developing nip (developing unit), so that stable development can be performed in a stable contact state.

Figure 3A:
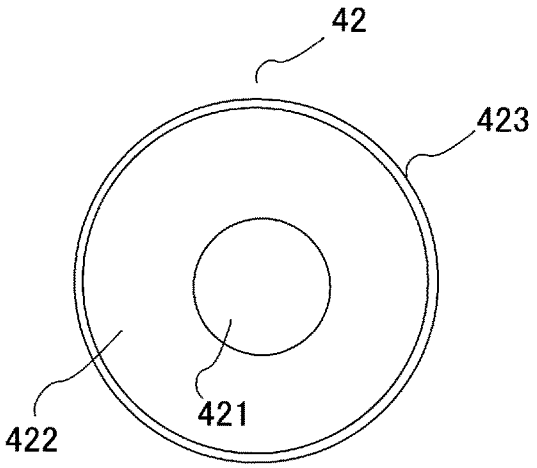
FIGS. 3A and 3B show examples of a developing roller used in the image forming apparatus according to Embodiment 1.
Figure 3B:
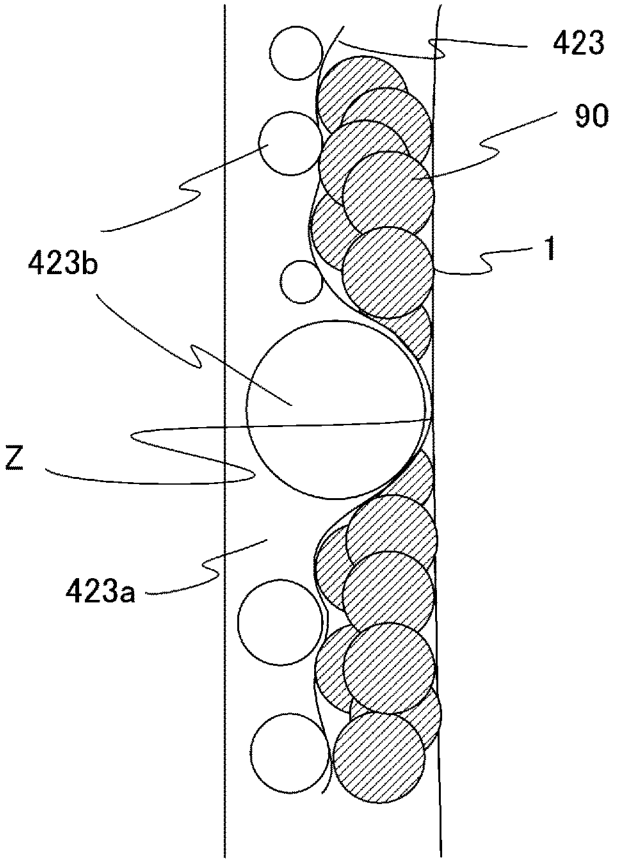

An example of the surface shape of the developing roller 42 is shown in FIGS. 3A and 3B. As shown in FIG. 3A, the developing roller 42 of the present embodiment has a base layer 422 and a surface layer 423 that are formed on the outer circumference of a shaft body 421. FIG. 3B is an enlarged sectional view of the developing nip portion where the developing roller 42 and the photosensitive drum 1 are in contact with each other. The surface layer 423 of the developing roller 42 has a structure in which coarse particles 423*b* are dispersed in a surface layer binder resin 423*a*. As a result, a plurality of irregularities including a plurality of concave portions for toner transport and a plurality of convex portions is formed on the surface of the surface layer 423. The ten-point average roughness Rzjis of the convex portions is larger than the volume average particle diameter of the toner 90. In the present embodiment, the volume average particle diameter of the toner 90 is 7 and the Rzjis of the surface layer 423 is 10 μm. A suitable Rzjis range of the surface layer of the developing roller is about 8 μm to 30 μm.

The toner image formed on the photosensitive drum 1 is electrostatically transferred to an intermediate transfer belt 53 by the primary transfer device 51 which is one of transfer members. A full-color toner image is formed by sequentially superimposing and transferring toner images of respective colors onto the intermediate transfer belt 53.

The full-color toner image is transferred onto a recording material P, which is a transfer target, by a secondary transfer device 52 which is a transfer member different from the primary transfer device 51. After that, the toner image on the recording material is pressed and heated by the fixing device 6 to fix the image on the recording material P. After that, the recording material P is discharged as a product with the image formed thereon.

A belt cleaning device 7 is installed downstream of the secondary transfer device 52 in the movement direction of the intermediate transfer belt 53 to remove and collect the toner 90 remaining on the intermediate transfer belt 53.

The intermediate transfer belt 53 is stretched by three rollers: a tension roller 58, a drive roller 57, and a counter roller 59 (secondary transfer counter roller). The tension roller 58 applies tension to the intermediate transfer belt 53 by moving around the rotation axis. The drive roller 57 transmits rotational drive to the intermediate transfer belt 53. The counter roller 59 is arranged at a position facing the secondary transfer roller 56, which is rotationally driven by the intermediate transfer belt 53, with the belt interposed therebetween. The secondary transfer device 52 is configured of the secondary transfer roller 56 and the counter roller 59.

In the present embodiment, an image bearing member cleanerless system is adopted in which the developing apparatus 4 collects the toner 90 that has not been transferred and remained on the surface of the photosensitive drum 1, without providing a dedicated cleaner device for the photosensitive drum 1. Until the surface of the photosensitive drum 1 that has passed the position facing the primary transfer device 51 (primary transfer position) reaches the contact position (charging position) with the charging roller 2, no member contacts the surface of the photosensitive drum 1. Accordingly, when the developing roller 42 of the developing apparatus 4 is brought into contact with the photosensitive drum 1, the developing apparatus 4 can collect the toner 90 remaining on the photosensitive drum 1 after image formation. When adopting such a cleanerless system, it is also preferable to use a non-magnetic one-component developer as the toner 90. However, in order to obtain the effect of the present invention, the above configuration is not limiting.

Next, an outline of the image forming process in the present embodiment will be described. During image formation, −300 V is applied to the developing roller 42. A voltage of −400 V is applied to the regulating blade 44, and −400 V is also applied to the toner supply roller 43. Since the charging polarity of the toner 90 of the present invention is negative, the toner is easily supplied from the toner supply roller 43 to the developing roller 42.

In the photosensitive drum 1, the surface potential of an image printing portion where the toner image is formed is controlled so that the absolute value thereof is lower than the voltage applied to the developing roller 42 on the side of the regular charging polarity of the toner 90. Meanwhile, in an image non-printing portion where no toner image is formed, the surface potential is controlled to a drum potential of −500 V. As a result, the toner charged by the potential difference with the developing roller 42 is developed in the image printing portion.

The toner image developed on the photosensitive drum is transferred to the intermediate transfer belt 53 at a primary transfer portion formed by the primary transfer device 51, but the toner with a low charge quantity and the toner charged with a polarity opposite to the regular charge are not transferred and dash between the charging roller 2 and the photosensitive drum 1. Also, the fogging toner also dashes into the charging roller 2 in the same manner. As a result, the toner is subjected to stress and is deformed between the charging roller 2 and the photosensitive drum 1 and may adhere to the photosensitive drum 1 as an attached matter. In the portions on the photosensitive drum where the toner has adhered, the transferability is lowered in the next image formation, so that the untransferred toner is more likely to occur. As a result, the fused matter on the photosensitive drum grows.

Since the laser beam emitted from the exposure device 3 is blocked at the fused portion on the photosensitive drum, the surface potential of the photosensitive drum 1 does not reach a predetermined potential, and the image density at the solid printing portion becomes low. In particular, where the fused matter continues in the rotational direction of the photosensitive drum, white streaks will appear on the image. Therefore, it is necessary to remove the toner remaining on the photosensitive drum.

Figure 4:
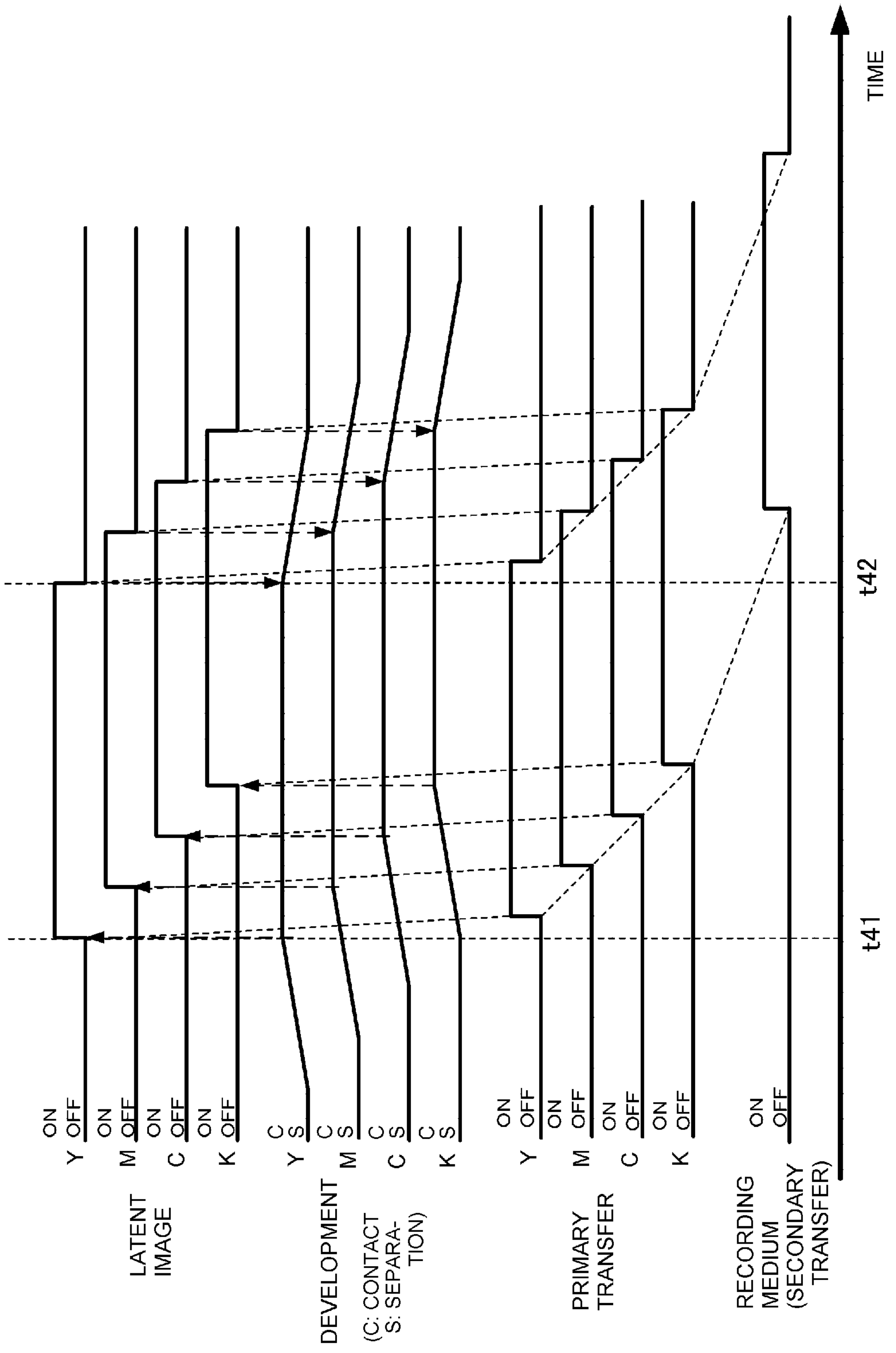
FIG. 4 is a conventional development separation timing chart.

FIG. 4 shows the timing of image formation in Comparative Example assumed from the conventional example. The latent images of yellow Y, magenta M, cyan C, and black K colors (Y latent image, M latent image, C latent image, and K latent image) are shown in two stages: a period during which the image (latent image) is formed (ON) and a period during which the image (latent image) is not formed (OFF). Further, with respect to the contact and separation of the developing apparatus of each color (Y development, M development, C development, and K development), the contact state is shown on the upper side, the separation state is shown on the lower side, and the change time between the two states is also shown. Further, the primary transfer of each color is indicated by a transfer period (ON) and a non-transfer period (OFF). Further, the secondary transfer to the recording medium (recording material P) is shown in two stages: a transfer period (ON) and a non-transfer period (OFF).

First, where an image formation start signal is input to the image forming apparatus 100, the intermediate transfer belt 53 and the photosensitive drums 1Y, 1M, 1C, and 1K start rotating. Then, the charging rollers 2Y, 2M, 2C, and 2K apply a DC voltage to charge the surfaces of the photosensitive drums 1Y, 1M, 1C, and 1K to a desired charging potential of negative polarity.

The exposure device 3 then radiates laser light on the basis of image information to start forming electrostatic latent images on the photosensitive drums 1Y, 1M, 1C, and 1K (on the image bearing members). This is the image forming ON timing of each color latent image in FIG. 4 (t41 for yellow Y). In the present embodiment, electrostatic latent images are formed in the order of a yellow latent image, a magenta latent image, a cyan latent image, and a black latent image (t42 for yellow Y).

Then, the developing apparatuses 4Y, 4M, 4C and 4K come into contact with the photosensitive drums 1Y, 1M, 1C and 1K on which the electrostatic latent images have been formed. This indicates that the contact state is reached in each color development in FIG. 4. As a result, the toner is supplied, the electrostatic latent images are visualized, and toner images are formed on the photosensitive drums 1Y, 1M, 1C, and 1K. At this time, the developing apparatuses 4Y, 4M, 4C, and 4K come into development contact with the photosensitive drums 1Y, 1M, 1C, and 1K immediately before image formation (toner image formation) in the order of magenta M, cyan C, and black K from yellow Y located on the upstream side in the rotation direction of the intermediate transfer belt 53. That is, as shown in FIG. 4, the contact state is established and the image formation of the toner image is performed in order from the upstream side to the downstream side.

Further, the developing apparatuses 4Y, 4M, 4C, and 4K assume a separation state in order from 4Y on the upstream side to 4K on the downstream side, and the image formation of the toner image is completed. In the case of mono-color printing, the state transition is performed by the contact/separation mechanism 48 so that only the developing apparatus 4K of black K is brought into the development contact state with the photosensitive drum 1K.

Figure 5:
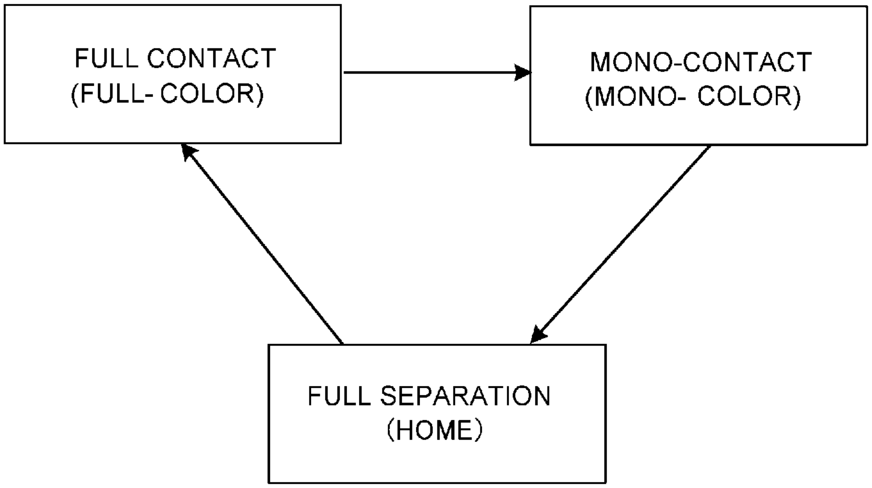
FIG. 5 explains the state transition between development contact and separation in Embodiment 1.

FIG. 5 shows an example of state transition between development contact and development separation in the present embodiment. The image forming apparatus 100 can take three states of "full separation", "full contact", and "mono-contact". The full separation is a state other than image formation, in which all the developing rollers are separated. Full contact is a state in which all the developing rollers are in contact during image formation in full-color printing. Mono-contact is a state in which only black K is in contact during image formation in mono-color printing. In the present embodiment, these three states transition from full contact to mono-contact, from mono-contact to full separation, and from full separation to full contact again, as indicated by arrows in the figure. The state transition in the present embodiment is as described above, but the present invention is not limited to this. A configuration that allows transition from full contact to full separation, transition from full separation to mono-contact, transition from mono-contact to full contact, and the like, is also applicable.

After that, the toner images formed on the photosensitive drums 1Y, 1M, 1C, and 1K are electrostatically transferred onto the intermediate transfer belt 53 by the primary transfer devices 51Y, 51M, 51C, and 51K (represents primary transfer ON of each color in FIG. 4).

The intermediate transfer belt 53 is a resin endless belt that is in contact with the photosensitive drums 1Y, 1M, 1C, and 1K. The intermediate transfer belt 53 is rotated clockwise in FIG. 1 by the drive motor 80 rotating the drive roller 57. A voltage is applied to the primary transfer devices 51Y, 51M, 51C, and 51K while the intermediate transfer belt 53 rotates following the rotation of the photosensitive drums 1Y, 1M, 1C, and 1K according to the image forming operation, whereby the single-color toner images are sequentially transferred onto the intermediate transfer belt 53 (primary transfer). The untransferred toner remaining on the photosensitive member is collected by the developing apparatuses 4Y, 4M, 4C, and 4K.

Figure 6:
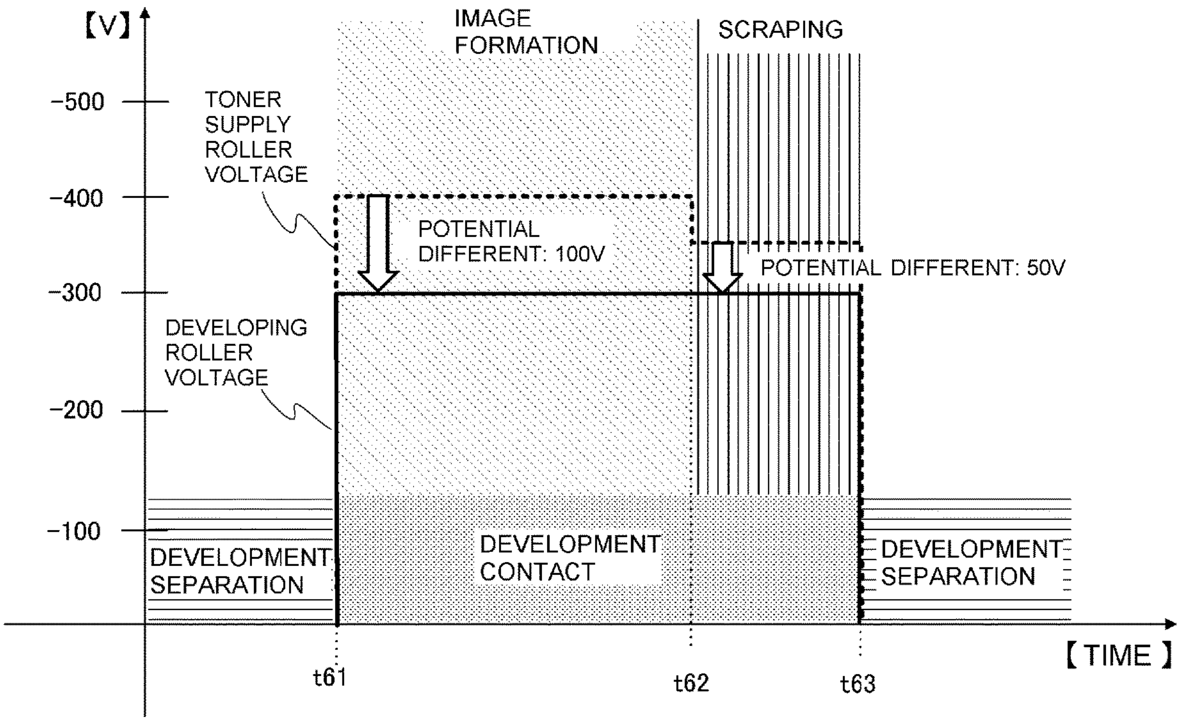
FIG. 6 explains the potential relationship in the scraping operation in Embodiment 1.

Next, the operation of suppressing the growth of fused matter on the photosensitive drum 1 will be described. FIG. 6 shows each voltage during image formation. The horizontal axis indicates the passage of time. The vertical axis indicates voltage. That is:

the voltage applied to the developing roller 42: −300 V (indicated by solid line); and the voltage applied to the toner supply roller 43: −400 V (indicated by the dashed line between t61 and t62).

Therefore, the difference between the voltages applied to the toner supply roller 43 and the developing roller 42 during image formation is −100 V. Further, in the present embodiment, since the regular charging polarity of the toner is negative, the potential difference formed as the driving force for supplying the toner from the toner supply roller 43 to the developing roller 42 is as follows:

potential difference: +100 V.

Where the image forming operation on the intermediate transfer belt 53 is completed in each print job, the control unit 65 changes the voltage applied to the toner supply roller 43 from −400 V during image formation to −350 V and rotates the toner supply roller for a predetermined time (indicated by the dashed line between t62 and t63). As a result, the potential difference changes from 100 V to 50 V, the pressing force of the toner from the toner supply roller 43 to the developing roller 42 becomes weaker than that during image formation, and the amount of toner on the developing roller becomes smaller than that during image formation. Hereinafter, this control, which is other than the image forming operation and in which the potential difference is made smaller than that during image formation and the developing roller 42 and the photosensitive drum 1 are rotated in contact with each other, is referred to as a scraping operation.

To summarize what is shown in FIG. 6, the voltage applied to the developing roller 42 rises at a timing t61 to become −300 V, and is applied until a timing t63. The voltage applied to the toner supply roller 43 rises to −400 V at the timing t61 and is maintained until a timing t62. The potential difference during this image forming operation is 100 V. At the timing t62, the voltage applied to the toner supply roller 43 becomes −350 V and is maintained until the timing t63. The potential difference during this scraping operation is 50 V.

When the voltage applied to the toner supply roller 43 during image formation is on the supply side (applied voltage difference >0), as in the present embodiment, where the voltage applied to the toner supply roller 43 during the scraping operation is closer to the voltage applied to the developing roller 42 than the applied voltage during image formation, it is difficult to supply the toner to the developing roller 42, and the supplied amount decreases. As a result, the amount of toner on the developing roller 42 decreases, and the surface unevenness of the developing roller 42 tends to come into direct contact with the photosensitive drum 1.

For example, when the voltage applied to the toner supply roller 43 is changed from −400 V to −350 V, the amount of toner on the developing roller 42 decreases, so that a part of the developing roller surface layer 423 becomes exposed from the toner coat on the developing roller 42 after passing the regulating blade 44.

Figure 7C:
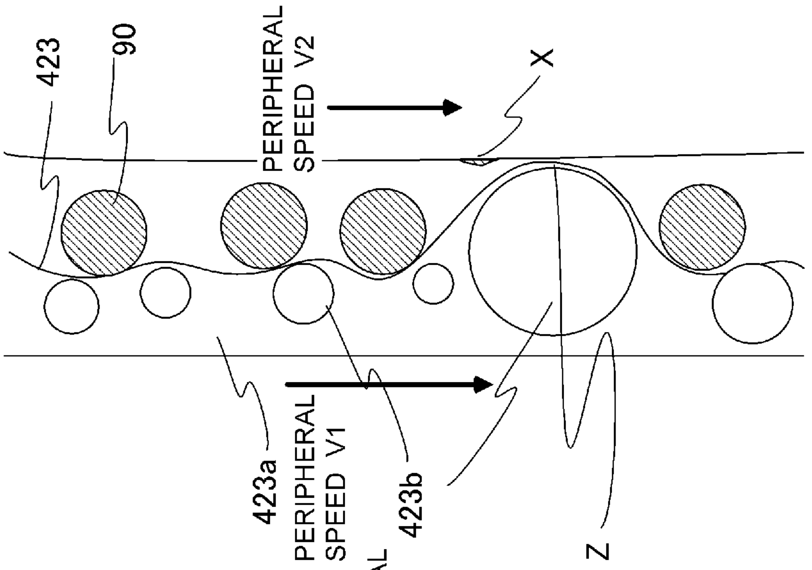
FIGS. 7A to 7C explain the state of the surface layers of the developing roller during the scraping operation in Embodiment 1.
Figure 7B:
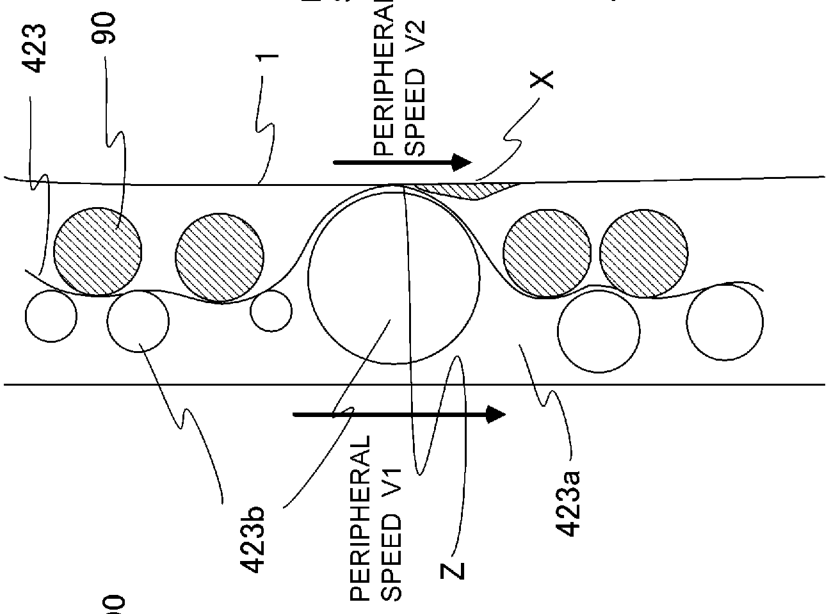
Figure 7A:
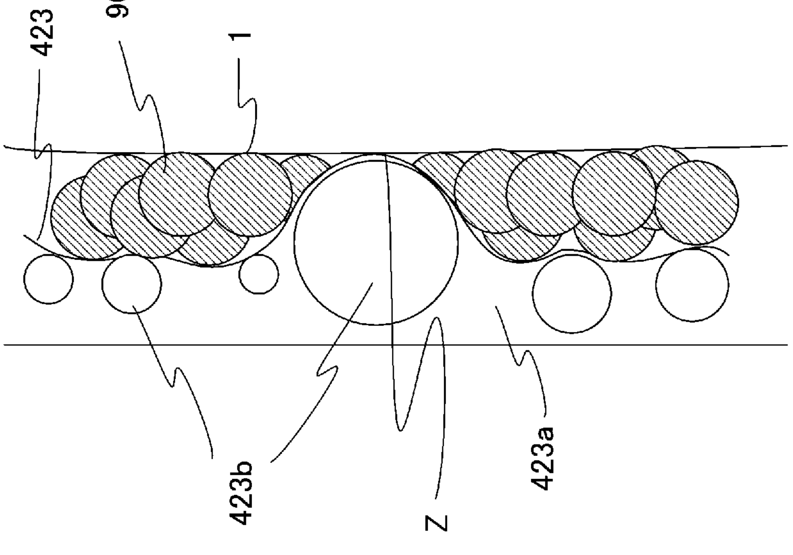

FIG. 7A shows the appearance of the developing roller surface layer 423 when the voltage applied to the toner supply roller 43 is −400 V (during the image forming operation in FIG. 6). FIG. 7B shows the developing roller surface layer 423 when the voltage applied to the toner supply roller 43 is −350 V (during the scraping operation in FIG. 6). FIG. 7B shows a state immediately before the fused matter X on the photosensitive drum 1 is scraped off by the portion exposed from the toner coat on the convex portion of the developing roller surface layer (indicated as an exposed portion Z in the drawing). Further, FIG. 7C shows a state immediately after the exposed portion Z has scraped off most of the fused matter X.

Here, where the peripheral speed of the developing roller 42 is V1 and the peripheral speed of the photosensitive drum 1 is V2, there is a peripheral speed difference between V1 and V2, and in the present embodiment, V1>V2. Thus, since the portion of the developing roller surface layer exposed from the toner coat is in contact with the photosensitive drum 1 and rotates with a difference in peripheral speed therewith, the fused matter on the photosensitive drum 1 can be scraped off. That is, the scraping operation means cleaning the surface of the photosensitive drum 1 by scraping off the fused matter, so it can also be said to be a cleaning operation.

By setting the voltage applied to the toner supply roller 43 during scraping to −250 V and creating the potential difference of −50 V, the potential relationship may be such that the toner is returned from the developing roller 42 to the supply roller 43 side.

Also, when the regular charge polarity of the toner is on the positive side, a voltage corresponding thereto may be applied. For example, the voltage applied to the developing roller 42 can be changed to +300 V during image formation, the voltage applied to the toner supply roller 43 can be changed to +400 V, and the voltage applied to the toner supply roller 43 during scraping can be changed to +350 V.

The end of the image forming operation on the intermediate transfer belt 53 means the timing at which the trailing edge of the image of each image forming station is transferred to the intermediate transfer belt 53. In the present embodiment, the scraping operation is sequentially performed from the image forming station located on the upstream side in which image formation has completed first. To simplify control, the scraping operation may be started simultaneously in all of the Y, M, C, and K image forming stations. The timing of transition to the scraping operation in this case is when the trailing edge of the image of the downstream-most image forming station K is transferred to the intermediate transfer belt 53.

Scraping Operation During Full-Color Printing

Figure 8:
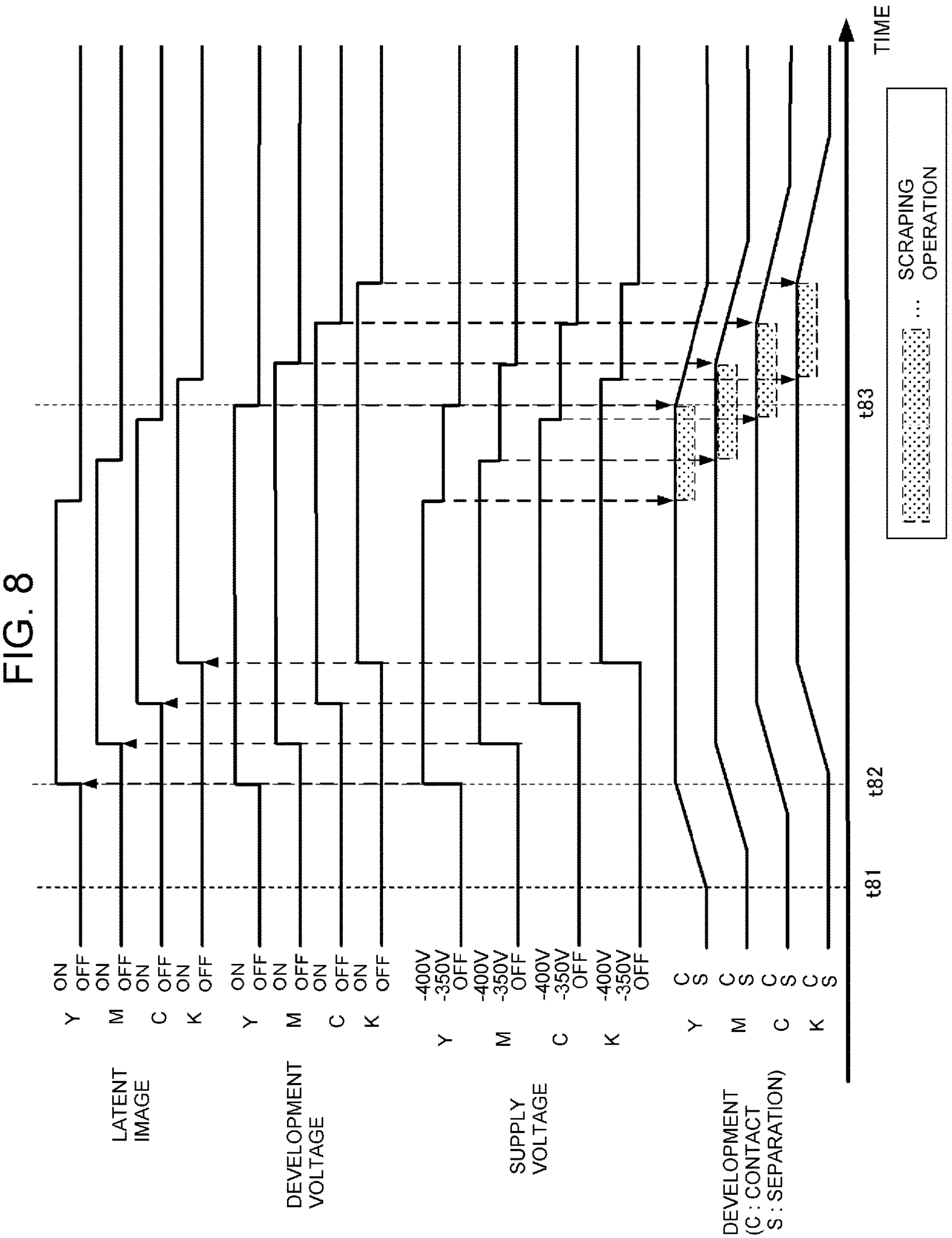
FIG. 8 is a timing chart of scraping after image formation in Embodiment 1.

FIG. 8 shows the timing of the scraping operation in each image forming station. The voltage applied to the developing roller 42, the voltage applied to the toner supply roller 43 during image formation, and the voltage applied to the toner supply roller 43 during scraping are shown.

The latent images of each color (Y latent image, M latent image, C latent image, and K latent image) are shown in two stages: a period (ON) during which the image (latent image) is formed and a period (OFF) during which the image (latent image) is not formed. Also, the development voltage (−300 V in the present embodiment) applied to the developing roller 42 of each color is shown in two stages, a period (ON) in which the voltage is applied and a period (OFF) in which the voltage is not applied. Further, the supply voltage applied to the supply roller 43 of each color is shown in three stages: a period (ON) in which −400 V is applied during image formation, a period (ON) in which −350 V is applied during scraping, and a period in which no voltage is applied (OFF). Further, with respect to the contact and separation of the developing apparatuses of each color (Y development, M development, C development, and K development), the contact state is shown on the upper side, the separation state is shown on the lower side, and the change time between the two states is also shown. Further, in this drawing, the scraping operation period in the contact state is shaded.

As in the case of FIG. 4, development contact is started in the order of yellow Y, magenta M, cyan C, and black K (t81 for yellow Y). Where the development contact is completed, the image forming operation starts (the timing of image forming ON for the latent image and of image forming ON for the developing roller voltage of each color in FIG. 8; t82 for yellow Y). The voltage applied to the toner supply roller 43 of each color is also set during image formation of the corresponding color. Thereafter, a Y image, an M image, a C image, and a K image (toner images) are formed in sequence by supplying toner to the formed latent images.

After the image formation of each color is completed, the voltage applied to the toner supply roller 43 of the corresponding color is changed from −400 V to −350 V (t83 for yellow Y). As a result, the scraping operation is sequentially started in the image forming stations S. At the timing when the predetermined scraping time has passed, the voltage of the developing roller 42 and the voltage of the toner supply roller 43 are turned OFF, and the scraping operation ends. After that, the development separation is performed, and the printing end operation is started and ended.

Figure 9:
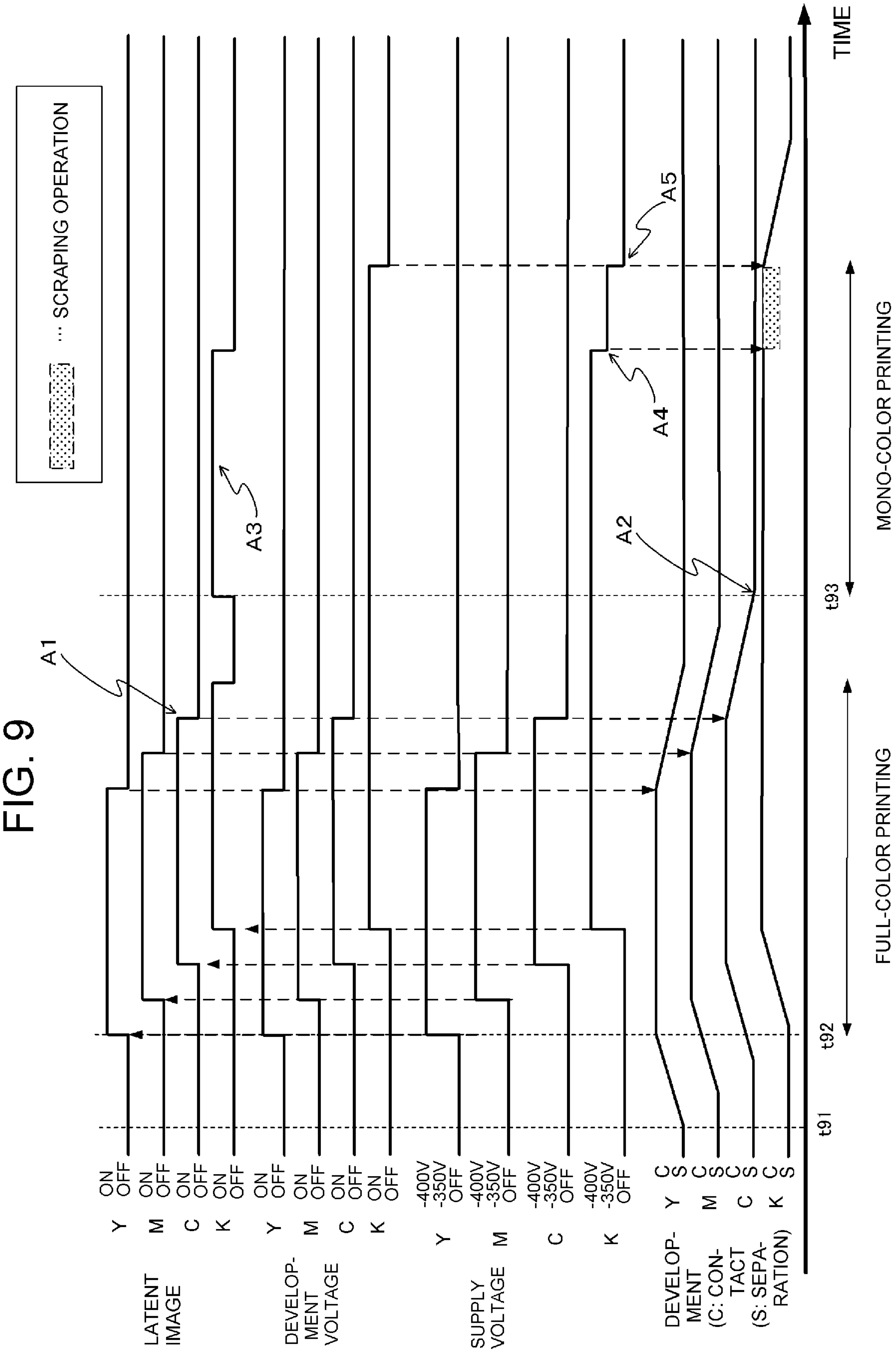
FIG. 9 is a timing chart of scraping when switching from full to mono in Comparative Example.

Scraping Operation During Switching from Full-Color to Mono-Color in Comparison Example Next, the scraping operation of Comparative Example assumed from the related art when full-color printing and mono-color printing are mixed will be described. FIG. 9 shows the timing of switching from full-color printing to mono-color printing.

In the full-color period, after the contact of the developing roller 42 has been started (t91 for yellow Y), image formation of the latent image is turned ON, the voltage applied to the developing roller 42 is turned ON, and the voltage applied to the toner supply roller 43 assumes a value at the time of image formation (t92 for yellow Y). Where the latent image formation is turned OFF, the voltages applied to the developing roller 42 and the toner supply roller 43 for yellow Y, magenta M, and cyan C are turned OFF (cyan C is indicated by symbol A1), and the developing rollers 42Y, 42M, and 42C assume a state of separation from the photosensitive drums 1Y, 1M, and 1C, respectively (indicated by symbols A2 and t93 for cyan C).

Meanwhile, for black, the voltage applied to the developing roller 42 is kept ON, and the voltage applied to the toner supply roller 43 is also kept at the value during image formation. Further, the developing roller 42K maintains a contact state with the photosensitive drum 1K. As a result, after the end of full-color printing, it is possible to switch to a mono-color printing operable state and print continuously without stopping the supply of high voltage or stopping the printing operation accompanied by the post-processing operation through the full separation (mono-color latent image formation is indicated by symbol A3). This corresponds to the state transition from full-contact (full-color) to mono-contact (mono-color) in FIG. 5. Subsequently, after image formation is performed in the mono-contact state, a transition is made from the voltage of the toner supply roller 43K of black K to the voltage at the time of scraping (indicated by symbol A4), and the scraping operation is executed (indicated by symbol A5).

According to the above timing chart, even when full-color printing and mono-color printing are mixed, the image forming speed does not drop significantly. Further, since the process cartridges for yellow Y, magenta M, and cyan C are not used more than necessary, performance deterioration of the process cartridges can be reduced.

However, in Comparative Example shown in FIG. 9, the developing apparatuses for yellow Y, magenta M, and cyan C are separated from the photosensitive drum 1 without the scraping operation being performed at the end of full-color printing. Therefore, the scraping operation after the image forming operation is carried out only in black K. Where such a print JOB continues, the scraping operations of the yellow Y, magenta M, and cyan C are not carried out, so the fused matter adheres to the photosensitive drum 1.

Figure 10:
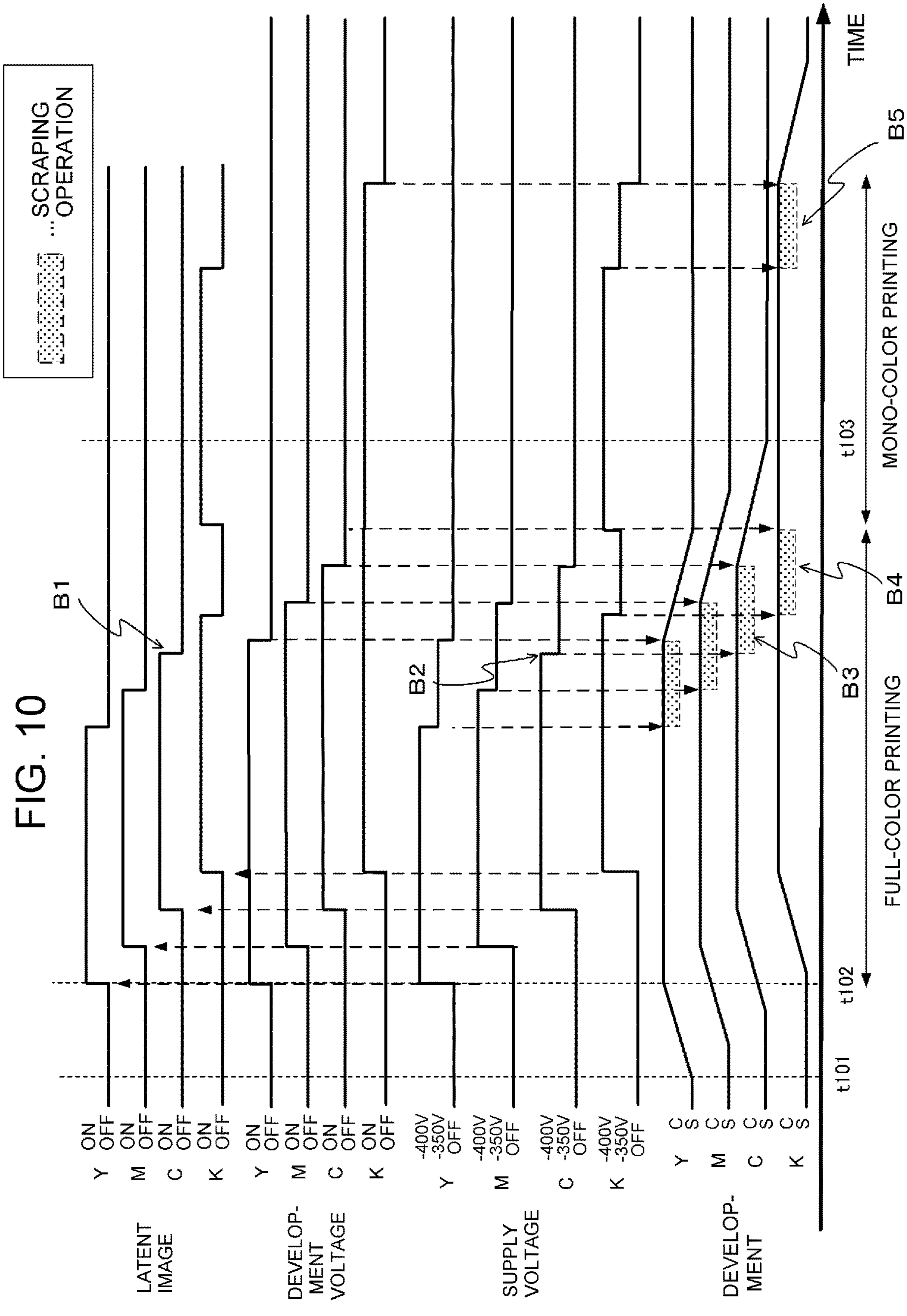
FIG. 10 is a timing chart of scraping when switching from full to mono in Embodiment 1.

Scraping Operation During Switching from Full-Color to Mono-Color in Present Embodiment Accordingly, in the present invention, as shown in FIG. 10, a scraping operation is performed when switching from full-color printing to mono-color printing. That is, in the period of full-color printing, after the developing roller 42 starts coming into contact (t101 for yellow Y), latent image formation is turned ON, voltage application to the developing roller 42 is turned ON, and the voltage applied to the toner supply roller 43 assumes a value at the time of image formation (t102 for yellow Y). Where the image formation of each color is completed, the voltage applied to the toner supply roller 43 is shifted to the value at the time of scraping operation while maintaining the voltage applied to the developing roller 42 at the time of image forming ON. As a result, the scraping operation is performed by the developing roller 42 in the contact state. As an example, for cyan C, the end of image formation (latent image) is indicated by reference symbol B1, the point where the voltage of the toner supply roller 43 is changed for the scraping operation is indicated by reference symbol B2, and the execution of the scraping operation is indicated by reference symbol B3.

After full-color printing, for yellow Y, magenta M, and cyan C, the voltage applied to the developing roller 42 and the voltage applied to the toner supply roller 43 are turned OFF, and the developing rollers 42Y, 42M, and 42C are separated from the photosensitive drums 1Y, 1M, and 1C (t103 for cyan C). Meanwhile, regarding black K, the voltage of the developing roller 42K is maintained, and the voltage of the toner supply roller 43K is returned to the value at the time of image formation. As a result, mono-color printing in black K can be executed. After image formation in black K, the scraping operation in black K is performed, and the processing in the figure ends. According to the above operation, the scraping operation for each color is performed when switching from full-color to mono-color, so fusion can be effectively suppressed.

In FIG. 10, the scraping operation in black K is performed for the same time as in yellow Y, magenta M, and cyan C during the switching operation from full-color printing to mono-color printing (indicated by reference symbol B4). However, in black K, the scraping operation is performed during mono-color printing after the switching operation (indicated by reference symbol B5), so the scraping time during the switching operation can be shortened.

Figure 11:
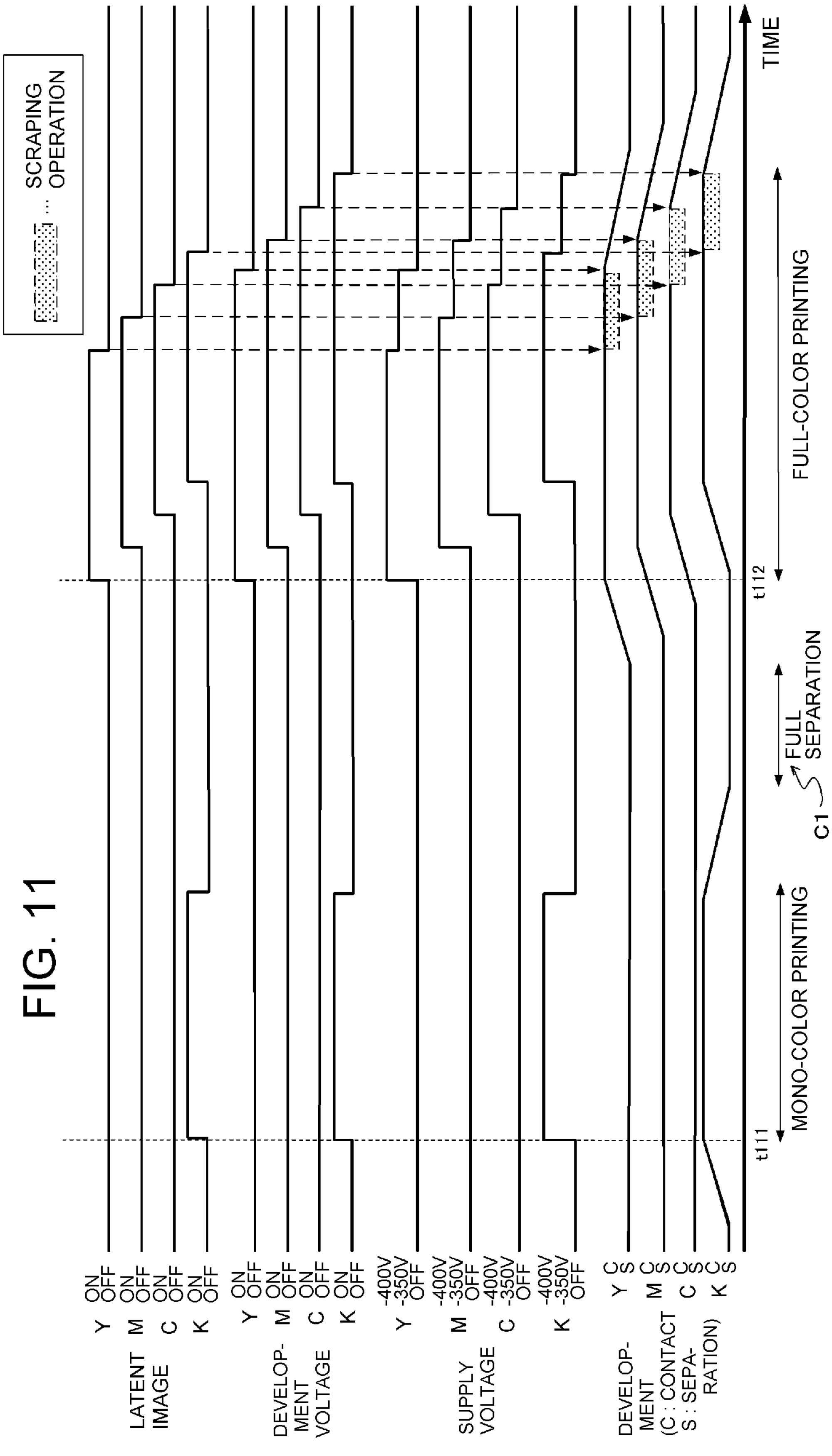
FIG. 11 is a timing chart of scraping when switching from mono to full in Comparative Example.

Scraping Operation During Switching from Mono-Color to Full-Color in Comparative Example Next, FIG. 11 shows the timing of switching from mono-color printing to full-color printing in Comparative Example assumed from the related art. First, in the mono-color printing period, the voltage of the developing roller 42K and the voltage of the toner supply roller 43K of black K are turned ON (t111), and only the developing roller 42K and the photosensitive drum 1K are in contact (mono-contact).

After that, in order to switch to full-color printing, the developing rollers 42Y, 42M, and 42C are brought into contact with the photosensitive drums 1Y, 1M, and 1C (t112 for yellow Y). This corresponds to a case in which in the state transition shown in FIG. 5, after starting from a mono-contact state (a state in which the developing roller 42K contacts the photosensitive drum 1K), the developing roller 42K is once separated from the photosensitive drum 1K to achieve a full-separation state (indicated by reference symbol C1), and then a transition is made to a full-contact state (a state in which the developing rollers 42Y, 42M, 42C and 42K are in contact with the photosensitive drums 1Y, 1M, 1C and 1K). Therefore, the time for switching from mono-color printing to full-color printing is longer than the time for switching from full-color printing to mono-color printing. The scraping operation is performed in yellow Y, magenta M, cyan C, and black K after image formation in full-color printing.

At this time, where the scraping operation is not performed when switching from mono-color printing to full-color printing, the possibility of drum fusion in black K increases. Meanwhile, where a scraping operation is performed at the time of switching in order to reduce the drum fusion, the timing of the development separation of black K needs to be delayed, which further lengthens the switching time.

Figure 12:
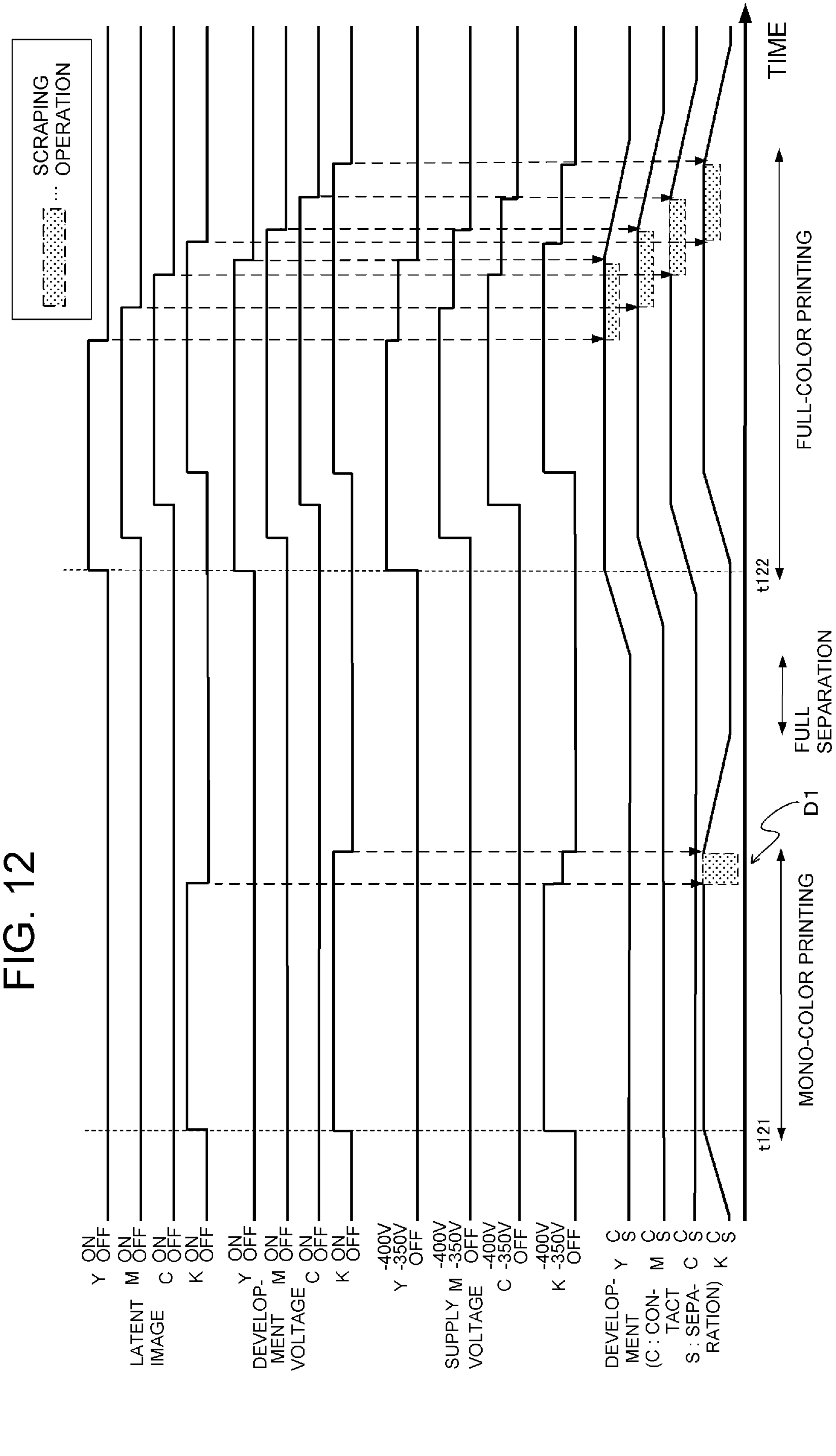
FIG. 12 is a timing chart of scraping when switching from mono to full in Embodiment 1.

Scraping Operation During Switching from Mono-Color to Full-Color in Present Embodiment Accordingly, in the present embodiment, as shown in FIG. 12, when switching from mono-color printing to full-color printing, the black K performs a scraping operation for a short time within a range where there is no or little influence on the switching time (reference symbol D1). Here, in the case of full-color printing the retransfer of images of the Y, M, and C image forming stations located upstream may occur in the black K image forming station SK (a phenomenon in which part of the previously transferred image is transferred to the photosensitive drum again when the next color toner is transferred). However, in the case of mono-color printing, the black K image forming station is not affected by the retransfer, so the scraping operation time can be shortened.

In the present embodiment, the time for the scraping operation during the switching operation from full-color printing to mono-color printing is set to 1.5 sec. Also, the time for the scraping operation during the switching operation from mono-color printing to full-color printing is set to 0.5 sec. However, the time for each scraping operation is not limited to this. For example, instead of setting the scraping time to a fixed value, the scraping time may be changed according to the number of prints, print pattern, environment, and the like. Further, the predetermined switching time A from full-color printing to mono-color printing is 1.0 sec, the predetermined switching time B from mono-color printing to full-color printing is 2.5 sec, and the development contact and separation times are each 1.0 sec.

Table 1 shows a comparison between the present embodiment and Comparative Example. In Comparative Example, "Without scraping" indicates the required time (sec) in the case where scraping was not performed and the state of drum fusion. "With scraping" indicates the required time (sec) when scraping was performed and the state of drum fusion. As for the state of drum fusion, "X" indicates fusion (NG), and "0" indicates no fusion (OK). A case in which the fusion state is different for black and other colors is indicated separately. Each time mentioned herein is only an example.

| | | Comparative Example | | Present Embodiment | |
|---|---|---|---|---|---|
| | | Switching time | Drum fusion | Switching time | Drum fusion |
| Switching from full-color to mono-color | Without scraping | Predetermined time A (1.0 sec) | Color : x Black : ○ | Predetermined time A (1.0 sec) + Scraping time (1.5 sec) | ○ |
| | With scraping | Predetermined time A (1.0 sec) + Development contact (1.0 sec) + Scraping time (1.5 sec) + Development separation (1.0 sec) | ○ | | |
| Switching from mono-color to full color | Without scraping | Predetermined time B (2.5 sec) | Color : x Black : ○ | Same as in related art (2.5 sec) (Scraping time 0.5 sec) | ○ |
| | With scraping | Predetermined time B (2.5 sec) + Scraping time (1.5 sec) | ○ | | |

(1) Switching from Full-Color to Mono-Color in Comparative Example

In the case of "Without scraping" after full-color printing, the switching time is the predetermined time A (1.0 sec). In this case, a transition from the full-contact state to the mono-contact state may be performed without going through the full-separation state, and no scraping operation is performed, so the required time is relatively short. However, since scraping after full-color printing is not performed, and only black K scraping after mono-color printing is performed, drum fusion of each color other than black occurs.

Meanwhile, in the case of "With scraping" after full-color printing, the switching time requires contact (1.0 sec) of the developing roller 42 separated after full-color printing, scraping (1.5 sec), and separation (1.0 sec) in addition to the predetermined time A, giving a total of 4.5 sec. In this case, fusion is removed at all the photosensitive drums.

(2) Switching from Full-Color to Mono-Color in Present Embodiment

In the present embodiment, after the full-color printing, the scraping operation is performed as it is without separating the developing rollers 42 of the respective colors, and then a transition is made to mono-color printing. Therefore, the required time is 2.5 sec in total of the predetermined time A (1.0 sec) and the scraping time (1.5 sec). Compared with the case of "Without scraping" in (1), the switching time is longer by 1.5 sec, but the drum fusion of each color can be removed. In addition, compared with the case of "With scraping" in (1), the effect of removing the drum fusion is the same, and the required time can be shortened by 2.0 sec.

In summary, when switching from full-color printing to mono-color printing, in Comparative Example in (1), drum fusion of yellow Y, magenta M, and cyan C occurs if the predetermined switching time A remains unchanged. In order to reduce the drum fusion, it is necessary to perform the development contact again in order to execute the scraping operation, which results in an extended switching time. Meanwhile, in the present embodiment in (2), the switching time which is longer than the required switching time A by the scraping time is required, but under the condition that the drum fusion does not occur, the switching can be performed in a shorter time than in the conventional example.

(3) Switching from Mono-Color to Full-Color in Comparative Example

In the case of "Without scraping" after mono-color printing, the switching time requires a predetermined time B (2.5 sec) longer than the predetermined time A because it is necessary to go through the full-separation state once. In addition, since the scraping is not performed after mono-color printing, the possibility of drum fusion in black K increases. Meanwhile, in the case of "With scraping" after mono-color printing, the switching time requires the black K scraping time (1.5 sec) in addition to the predetermined time B for a total of 3.5 sec. In this case, fusion is removed from all the photosensitive drums.

(4) Switching from Mono-Color to Full-Color in Present Embodiment

The required time in the present embodiment is 3.0 sec in total of the predetermined time B (2.5 sec) and the scraping time (0.5 sec), and the switching time is the same as in the case of "Without scraping" in (2). This is because the scraping operation is performed in parallel at the end of the required time. In addition, compared with the case of "With scraping" in (2), the effect of removing drum fusion is the same, and the required time can be shortened by 1.5 sec.

In summary, when switching from mono-color printing to full-color printing, in the conventional example in (3), where the predetermined switching time B remains unchanged, drum fusion in black K occurs. In order to reduce the drum fusion, the scraping operation is performed, so the development separation needs to be delayed, resulting in an extended switching time. By contrast, in the present embodiment in (4), the scraping operation is implemented in a range within the switching operation time, switching can be performed in the same time as in the conventional example and the occurrence of drum fusion can be suppressed.

By doing so, when full-color printing and mono-color printing are mixed, it is possible to efficiently perform the switching operation while implementing the scraping operation. In the present embodiment, a mechanism that can be implemented independently in each process cartridge is used for development contact/separation, but a configuration may be used in which yellow Y, magenta M, and cyan C are used in common to obtain a contact/separation mechanism 48 separate from black K.

According to the present embodiment, in an image forming apparatus of a cleanerless system in which the developing roller 42 and the photosensitive drum 1 can be brought into contact with each other and separated from each other, a scraping operation of removing the attached matter on the photosensitive drum surface by the developing roller can be implemented during the operation of switching from full-color printing to mono-color printing, and from mono-color printing to full-color printing. Therefore, in the cleaning operation of cleaning the photosensitive drum 1, unnecessary contact time between the photosensitive drum 1 and the developing roller 42 can be reduced, and the switching operation can be performed efficiently.

Embodiment 2

Embodiment 2 will be explained using FIG. 13. When the present embodiment is compared with Embodiment 1, the difference therebetween is in the scraping operation during the switching operation from mono-color printing to full-color printing. Since the configuration and operation of the apparatus are mostly the same as those of Embodiment 1 described above, the following description focuses on points that differ from Embodiment 1.

Figure 13:
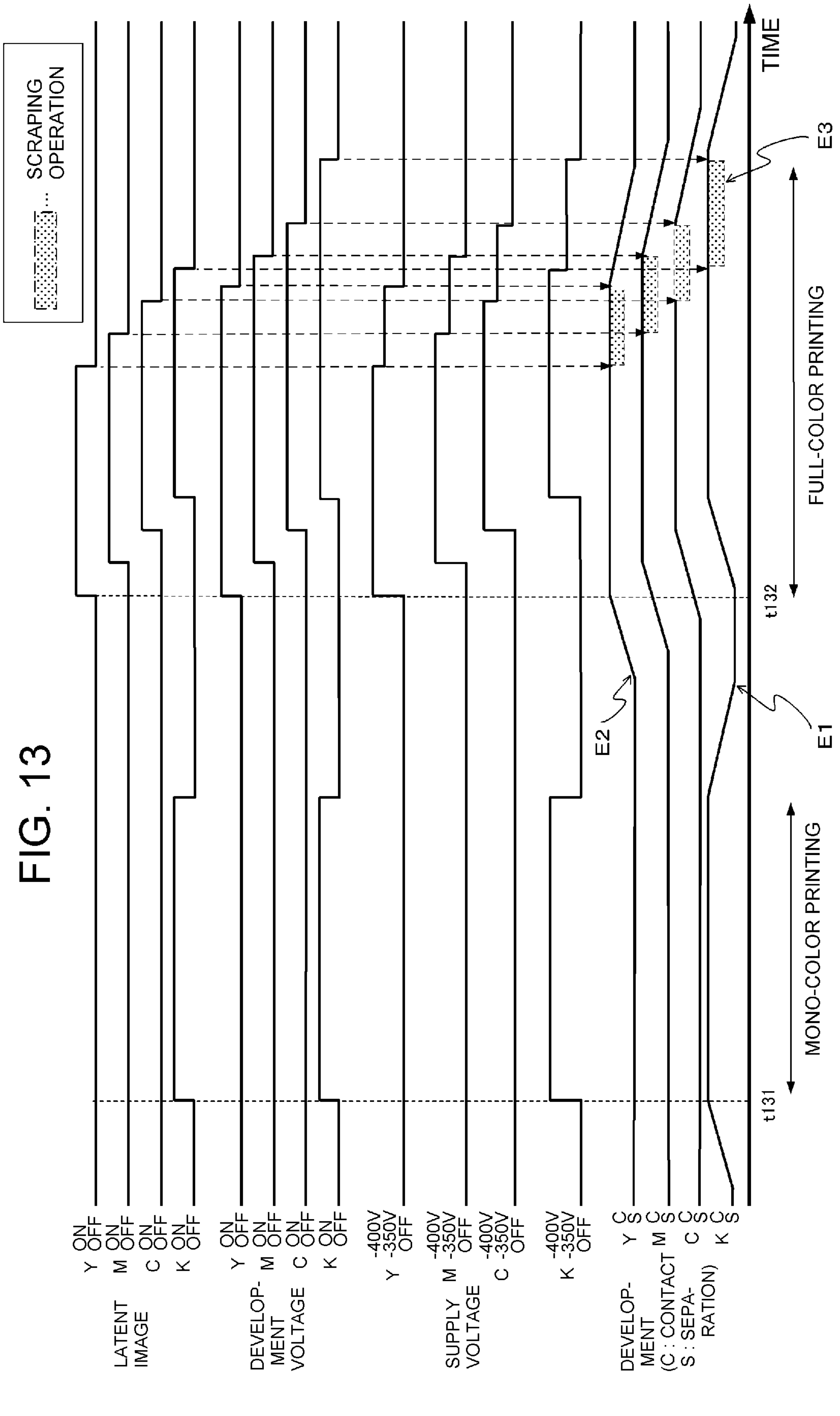
FIG. 13 is a timing chart of scraping when switching from mono to full in Embodiment 2.

FIG. 13 shows the timing of switching from mono-color printing to full-color printing. In the case where no image defect occurs due to the impact at the time of contact with the developing roller 42, the contact of yellow Y is started (reference symbol E2) after the separation operation of black K is completed (reference symbol E1), thereby making it possible to minimize the time of the switching operation. In this case, where the scraping operation is implemented during the switching operation, the switching time is extended.

Therefore, in the present embodiment, as shown in FIG. 13, the scraping operation during the switching operation after image formation in mono-color printing is performed in combination with the scraping operation implemented after full-color printing. That is, the time of the scraping operation after full-color printing is extended. Thus, for black K, by performing the scraping operations collectively after the image formation in full-color printing, the attached matter on the photosensitive drum surface can be removed without extending the switching time.

As described above, in the present embodiment, since the scraping operations during the switching operation from mono-color printing to full-color printing are collectively performed after full-color printing, the contact of yellow Y after mono-color printing can be accelerated, and the switching time can be shortened. Therefore, the unnecessary contact time between the photosensitive drum and the developing roller can be reduced, and the switching operation can be performed efficiently.

According to the present invention, when full-color printing and mono-color printing are mixed in a job in an image forming apparatus of a cleanerless system in which the developing roller 42 and the photosensitive drum 1 can be brought into contact with each other and separated from each other, the toner fusion on the drum can be removed and also the switching time can be shortened in the case of performing a scraping operation at the time of transition from full-color printing to mono-color printing or transition from mono-color printing to full-color printing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-061733, filed on Apr. 1, 2022, which is hereby incorporated by reference wherein in its entirety.

What is claimed is:

1. An image forming apparatus comprising a first image forming unit corresponding to a first color and a second image forming unit corresponding to a second color other than the first color, wherein the first image forming unit includes: a rotatable first image bearing member, a surface of which is exposed to light to form an electrostatic latent image on the surface of the first image bearing member; a rotatable first developing member that contacts the first image bearing member to supply a developer to the surface of the first image bearing member and that rotates at a rotational speed different from a rotational speed of the first image bearing member; and a first developer supply member that supplies the developer to the surface of the first developing member, and wherein the second image forming unit includes: a rotatable second image bearing member, a surface of which is exposed to light to form an electrostatic latent image on the surface of the second image bearing member; a rotatable second developing member that contacts the second image bearing member to supply a developer to the surface of the second image bearing member and that rotates at a rotational speed different from a rotational speed of the second image bearing member; and a second developer supply member that supplies the developer to the surface of the second developing member, the image forming apparatus further comprising:

a control unit configured to control a development voltage applied to the first developing member and the second developing member and a supply voltage applied to the first developer supply member and the second developer supply member, the control unit being capable of executing an image forming operation of forming a developer image on the surface of the first image bearing member by supplying the developer to the latent electrostatic image formed on the surface of the first image bearing member from the first developing member and of forming a developer image on the surface of the second image bearing member by supplying the developer to the latent electrostatic image formed on the surface of the second image bearing member from the second developing member, and a cleaning operation which is other than the image forming operation and by which an attached matter that has attached to the surface of the image bearing member is removed by the developing member, wherein the image forming operation includes a first image forming operation of forming an image by using only the first image forming unit, and a second image forming operation of forming an image by using the first image forming unit and the second image forming unit;

the first image forming unit can move the first developing member between a contact state in which the first developing member and the first image bearing member are in contact with each other and a separation state in which the first developing member and the first image bearing member are separated from each other, the second image forming unit can move the second developing member between a contact state in which the second developing member and the second image bearing member are in contact with each other and a separation state in which the second developing member and the second image bearing member are separated from each other, and, the image forming operation and the cleaning operation are performed in the contact state; and the control unit is configured to perform control to execute the cleaning operation after the second image forming operation in a case of switching from the second image forming operation to the first image forming operation;

to perform control to execute the cleaning operation in the first image forming unit and the second image forming unit without causing the second developing member that is in the contact state with the second image bearing member to make a transition to the separation state in the second image forming unit; and to perform control to cause the second developing member to make a transition to the separation state in the second image forming unit after the cleaning operation, and to execute the first image forming operation in the first image forming unit.

2. The image forming apparatus according to claim 1, wherein the control unit is configured to make the time of the cleaning operation in the first image forming unit shorter than the time of the cleaning operation in the second image forming unit in the cleaning operations executed in the first image forming unit and the second image forming unit after the second image forming operation in a case of switching from the second image forming operation to the first image forming operation.

3. The image forming apparatus according to claim 1, wherein:

the control unit is configured to execute the second image forming operation in the first image forming unit and the second image forming unit after executing the cleaning operation in the first image forming unit and causing the second developing member to make a transition to the contact state in the second image forming unit, without causing the first developing member that is in the contact state with the first image bearing member to make a transition to the separation state in the first image forming unit at the time of the first image forming operation in a case of switching from the first image forming operation to the second image forming operation.

4. The image forming apparatus according to claim 3, wherein:

the control unit is configured to perform the cleaning operation in the first image forming unit and the second image forming unit after executing the second image forming operation, and in the first image forming unit, the time of the cleaning operation executed when switching from the first image forming operation to the second image forming operation is shorter than the time of the cleaning operation executed after the second image forming operation.

5. The image forming apparatus according to claim 1, wherein:

the control unit is configured to execute the cleaning operation in the first image forming unit and the second image forming unit after the second image forming operation in a case of switching from the first image forming operation to the second image forming operation, and the time of the cleaning operation in the first image forming unit is longer than the time of the cleaning operation in the second image forming unit.

6. The image forming apparatus according to claim 1, wherein:

a positional relationship of the first developing member in the first image forming unit with respect to the first image bearing member and a positional relationship of the second developing member in the second image forming unit with respect to the second image bearing member are switched among: (i) a state in which the first developing member is in contact with the first image bearing member in the first image forming unit and the second developing member is in contact with the second image bearing member in the second image forming unit, (ii) a state in which only the first developing member of the first image forming unit is in contact with the first image bearing member, and (iii) a state in which the first developing member is separated from the first image bearing member in the first image forming unit and the second developing member is separated from the second image bearing member in the second image forming unit.

7. The image forming apparatus according to claim 1, further comprising:

an intermediate transfer member, which is an endless belt and to which the developer images formed in the first image forming unit and the second image forming unit are transferred while the intermediate transfer member is rotated, wherein the first image forming unit is arranged downstream of the second image forming unit in the rotation direction of the intermediate transfer member.

8. The image forming apparatus according to claim 1, wherein:

the cleaning operation is a scraping operation for removing attached matter, which has attached to the surface of the first image bearing member and the second image bearing member, due to the peripheral speed difference between the developing member and the image bearing member.

9. The image forming apparatus according to claim 1, wherein:

the first image forming operation is mono-color printing using the first color, and the second image forming operation is printing using a plurality of colors.

* * * * *